United States Patent [19]

Itoh et al.

[11] Patent Number: 5,529,158
[45] Date of Patent: Jun. 25, 1996

[54] HUB CLUTCH DEVICE

[75] Inventors: Kenichiro Itoh, Iwata-gun; Isao Hori, Iwata, both of Japan

[73] Assignee: NTN Corporation, Osaka, Japan

[21] Appl. No.: 252,361

[22] Filed: Jun. 1, 1994

[30] Foreign Application Priority Data

| Jun. 10, 1993 | [JP] | Japan | 5-138308 |
| Jun. 10, 1993 | [JP] | Japan | 5-138357 |
| Nov. 26, 1993 | [JP] | Japan | 5-296627 |
| Nov. 30, 1993 | [JP] | Japan | 5-300021 |

[51] Int. Cl.$^6$ ............ F16D 41/067; F16D 41/07; B60K 17/34
[52] U.S. Cl. ............ 192/35; 192/45; 192/45.1; 192/48.92; 192/50
[58] Field of Search ............ 192/45.1, 38, 37, 192/44, 50, 35, 48.92, 45; 180/233

[56] References Cited

U.S. PATENT DOCUMENTS

| 2,910,159 | 10/1959 | Nielsen | 192/45.1 |
| 3,055,471 | 9/1962 | Warn et al. | 192/35 X |
| 4,901,831 | 2/1990 | Ito et al. | 192/38 |
| 5,135,084 | 8/1992 | Ito et al. | 192/45.1 X |
| 5,269,399 | 12/1993 | Ito et al. | 192/45.1 |
| 5,355,981 | 10/1994 | Itoh et al. | 192/35 |

FOREIGN PATENT DOCUMENTS

| 436270A1 | 7/1991 | European Pat. Off. | |
| 5-118358 | 5/1993 | Japan | 192/45.1 |
| 6-17853 | 1/1994 | Japan | 192/48.92 |
| 6-33957 | 2/1994 | Japan | 192/48.92 |
| 6-26533 | 2/1994 | Japan | 192/48.92 |
| 2259962 | 3/1993 | United Kingdom | 192/48.92 |

Primary Examiner—Rodney H. Bonck
Attorney, Agent, or Firm—Nikaido, Marmelstein, Murray & Oram

[57] ABSTRACT

A hub clutch capable of automatically engaging and disengaging the front wheel axle to and from the wheel hubs according to the difference in rotational speeds therebetween. It has an inner ring coupled to the front wheel axle, an outer ring coupled to the wheel hub, a first retainer and a second retainer provided between the inner and outer rings, and sprags held by the first and second retainers. To one end of the first retainer is coupled a switch spring for producing a turning effort. A turning effort imparting device is coupled to its other end through a one-way clutch. While the vehicle is moving forward, the sprags are kept in a forward-travel ready-to-engage position, with the one-way clutch idling. When the vehicle begins to move backward, the one-way clutch locks, so that the sprags are inclined in the opposite direction to assume a backward-travel ready-to-engage position. When the wheel hub begins to rotate faster than the front wheel axle, the outer ring will overrun the sprags, disengaging the front wheels.

9 Claims, 16 Drawing Sheets 5,529,158

HUB CLUTCH DEVICE

This invention relates to a hub clutch device for transmitting and cutting off the driving force between the front wheel axle and the front wheel hubs and a driving force transmission mechanism including the hub clutch device.

In a normal traveling mode, a part-time four-wheel drive vehicle is driven, more often than not, only by its rear wheels, with its front wheels not driven. In this case, during the rear-wheel drive mode, if the front wheels were rotated in unison with the driving mechanism of the vehicle including the propeller shaft, front differential and front wheel axle, it would have deleterious effect on fuel efficiency and/or noise while traveling.

Thus, a conventional four-wheel drive vehicle is provided with hub clutch devices for cutting off and connecting the driving force transmission between the front wheel hubs and the front wheel axle. During a normal traveling mode, the front wheels are disconnected from the driving mechanism of the vehicle.

But such a conventional hub clutch has only the function of simply connecting the axle and the wheel hubs together or disconnecting them from each other. Namely, what this device can do is simply to reduce fuel consumption and noise by disconnecting the front wheels from the front wheel driving mechanism during a normal traveling mode.

Namely, as long as the hub clutch is engaged, the front wheels and their axle are directly coupled together at all times. When the vehicle turns a tight corner in this state, a braking phenomenon will occur due to a difference in turning distances between the front wheels and the rear wheels and thus slip will occur between them.

It was therefore necessary to change over the driving mode between two-wheel drive and four-wheel drive every time the vehicle moved from normal travelling on a paved road to an off-road travel or vice versa by manually operating the hub clutch device or the transfer. Such manual operation was troublesome and time-consuming.

It is an object of this invention to provide a hub clutch device which is free of the above problems, and which can automatically connect and disconnect the front wheel axle and the front wheel hubs according the difference in the speed of rotation therebetween.

Another object of this invention is to provide a power transmission mechanism for a vehicle which includes the above-mentioned hub clutch device, which is simple in structure and which permits a direct-connect, full-time four-wheel drive.

In order to attain the above objects, the hub clutch device comprises a driving member, a driven member rotatably mounted around the driving member, a plurality of engaging elements disposed between the driving member and the driven member and adapted to engage the driving member and the driven member to couple them together when they rotate in either direction, retainer means mounted between the driving member and the driven member for keeping the engaging elements spaced apart by a predetermined angular distance from one another, the retainer means being coupled with the driving member so that the retainer means will rotate together with the driving member, with a play in the circumferential direction left between the entire portion or a part of the retainer means and the driving member to allow them to rotate relative to each other, two turning effort imparting means for imparting to the retainer means turning efforts in opposite directions, and means for changing over the direction of turning effort applied to the retainer means according to the direction of rotation of the driving member.

The driving force transmission mechanism for a vehicle according to this invention includes two hub clutch device of the above described type, mounted between the front wheel axle and the front wheel hubs. The front wheel axle is coupled to the propeller shaft, which is in turn coupled to the rear wheel axle through a differential.

With the hub clutch device according to the present invention, when the vehicle moves ahead and the front wheel axle rotates, the turning effort of one of the two turning effort imparting means acts on the retainer, thus causing the retainer and the driving member to turn relative to each other by a distance equal to the size of the gap formed therebetween in the direction of rotation and bringing the engaging elements to forward-travel engaged position. In contrast, when the vehicle moves backward and the front wheel axle is rotated in a reverse direction, the changeover means operates to change over the direction of turning effort applied. In this state, the turning effort of the other turning effort imparting means acts on the retainer, thus causing the retainer and the driving member to turn relative to each other in the opposite directions. The engaging elements are now moved to backward-travel engaged position.

When the vehicle begins to turn a corner with the engaging elements assuming one of the above two engaged positions, the wheel hubs, which rotate together with the front wheels, begin to rotate faster than the front wheel axle, so that the driven member coupled to each wheel hub will overrun and disengage from the driving member. The vehicle is thus driven only by the rear wheels.

If the rear wheels slip while the engaging elements are in the engaged position, the rotational speed of the wheel hubs will drop below that of the axle, so that the engaging elements will engage both the driving member and the driven member. In this state, the driving force is transmitted to the front wheels and the vehicle is driven on all four wheels.

The driving force transmission mechanism for a vehicle according to the present invention includes hub clutch devices of the above-described type. They are mounted between the front wheels and their axle and serve as a center differential for changing over the driving mode according to the difference in revolving speed between the driving side and the driven side. With this arrangement, it is possible to achieve a direct-connect, full-time four-wheel drive with a differential omitted in the front wheel driving mechanism.

The hub clutch device of the present invention utilizes the engaging and free-running characteristics of a mechanical clutch to automatically engage and disengage the driving connection between the front wheel axle and the front wheel hubs according to the difference in rotational speed therebetween. Thus, it is possible to achieve a full-time, direct-connect four-wheel drive without the possibility of braking occurring while turning a tight corner even with four wheels coupled together.

Also, since the engaging elements are kept in the ready-to-engage position at all times, when the axle rotates faster than the wheel hubs even slightly due to rear wheel slip, etc., the engaging elements will engage instantly. Thus, with this arrangement, the driving mode can be changed over with quick response and a large driving force can be transmitted.

Other features and objects of the present invention will become apparent from the following description made with reference to the accompanying drawings, in which.

Figure 1:
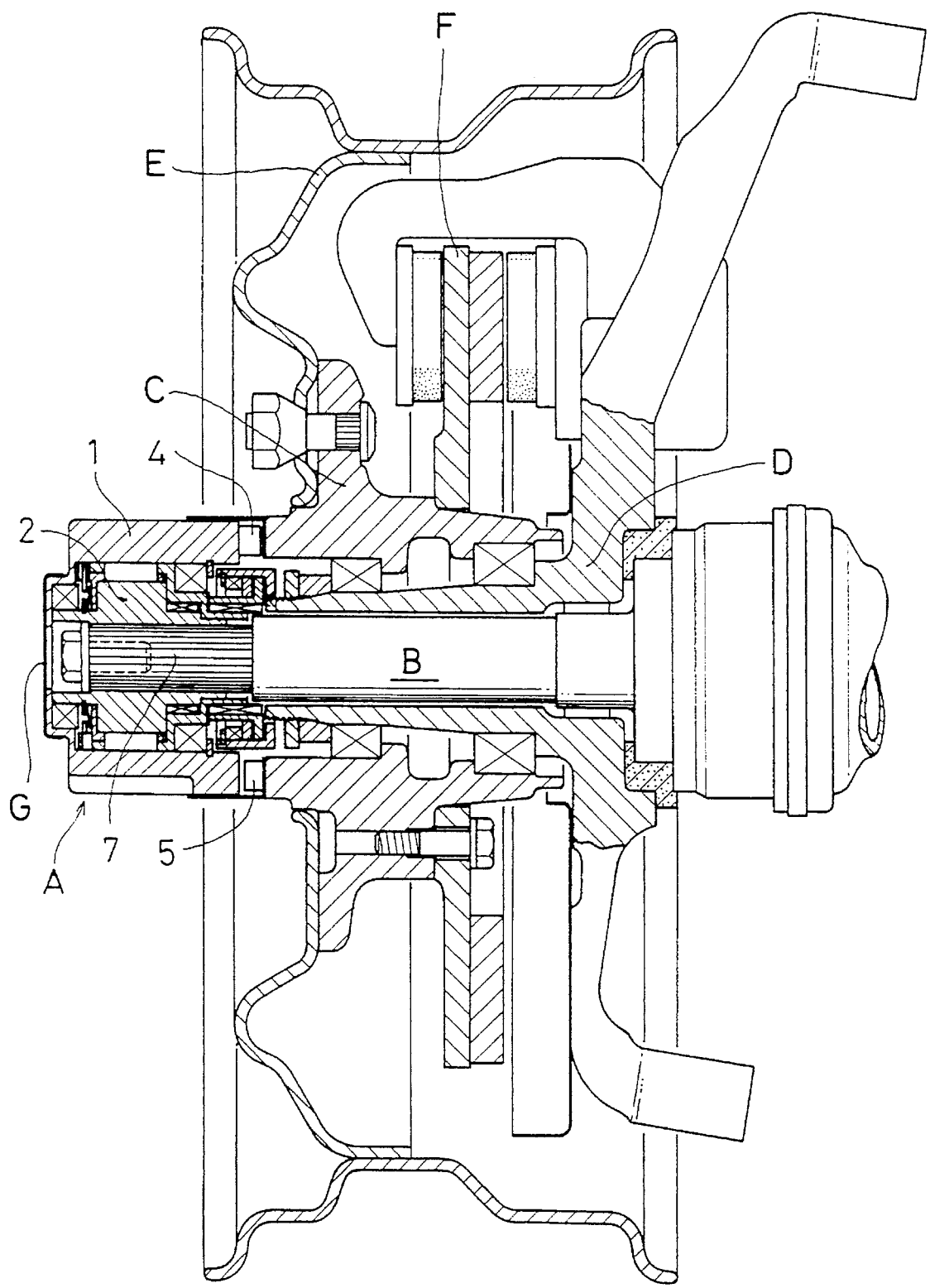
FIG. 1 is a front view partially in vertical section of a first embodiment.

FIGS. 1–9 show the first embodiment of this invention. FIG. 1 shows a hub clutch device A mounted on a front wheel axle B of a vehicle. A knuckle D fits on the front wheel axle B and is fixed to the vehicle body except its front portion. A wheel hub C is rotatably supported on the knuckle D through bearings.

The wheel hub C carries a tire wheel E and a brake device F. A waterproof and dust-proof cap G is put on the front end of the wheel hub C.

An inner ring 2, which is the driving member of the hub clutch device A, is fixedly mounted on the front end of the front wheel axle B through a serration 7. An outer ring 1 as a driven member is rotatably mounted on the inner ring 2 through a bearing 3 (FIG. 2).

Figure 3:
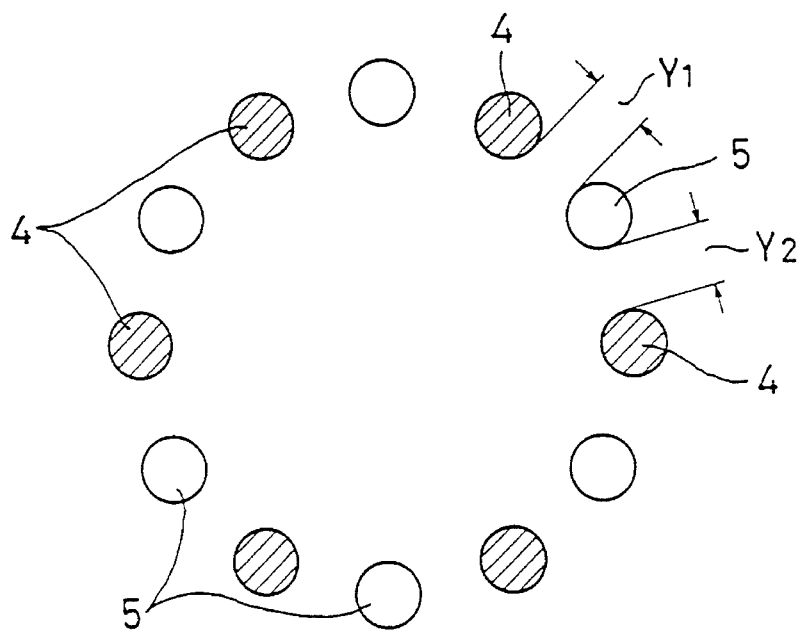
FIG. 3 is a sectional view taken along line III—III of FIG. 2.

The outer ring 1 has an end face 1a disposed opposite to an end face 9 of the wheel hub C with a gap therebetween. On the end faces 1a and 9 are provided torque transmitting protrusions 4 and 5, respectively, adapted to engage each other. As shown in FIG. 3, the protrusions 4 and 5 are alternately arranged in the direction of rotation with plays Y (Y=Y1+Y2) formed therebetween. When transmitting torque, the outer ring 1 and the wheel hub C are not directly coupled together but rather can rotate relative to each other to the extent of the plays Y in the direction of rotation.

Figure 2:
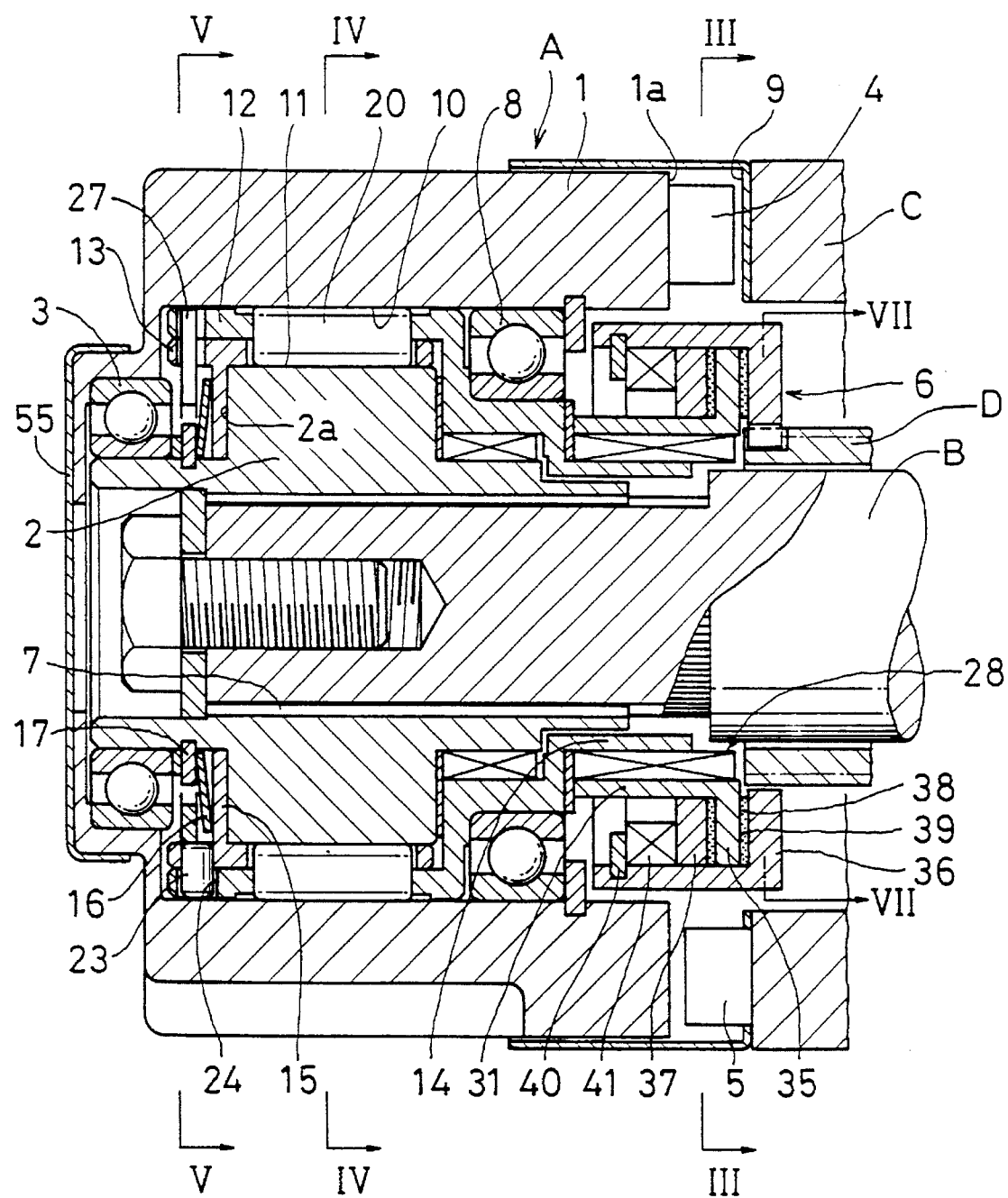
FIG. 2 is a partial enlarged sectional view of the same.
Figure 4:
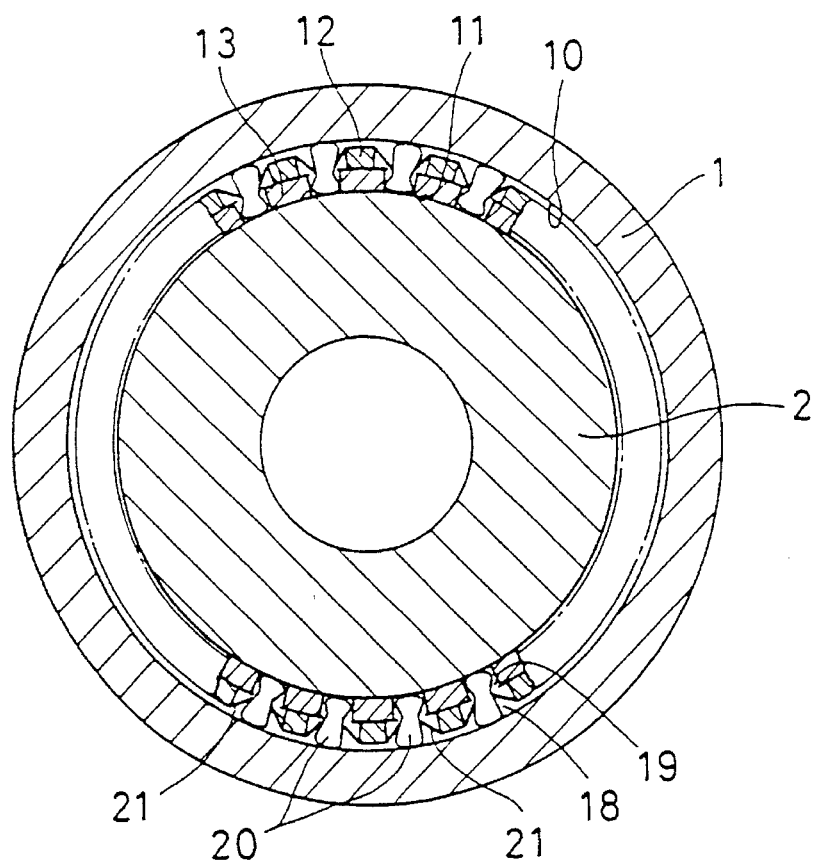
FIG. 4 is a sectional view taken along line IV—IV of FIG. 2.

As shown in FIGS. 2 and 4, concentric cylindrical surfaces 10 and 11 are formed on the inner peripheral surface of the outer ring 1 and on the outer peripheral surface of the inner ring 2, respectively. Between the cylindrical surfaces 10 and 11 are mounted a first retainer 12 and a second retainer 13.

The first retainer 12 has an integral arm 14 extending from its rear end. The arm 14 is supported by a bearing 8 so as to be rotatable relative to the outer ring 1 and the inner ring 2.

On the other hand, the second retainer 13 is formed with a bent portion 15 extending radially inwards. The bent portion 15 is slidably and rotatably in contact with an end face 2a of the inner ring 2. Between the bent portion 15 and a snap ring 17 of the bearing 3 is provided a crimp spring 16 in the form of a disc spring to urge the bent portion 15 against the end face 2a of the inner ring 2. The second retainer 13 is pressed against the inner ring 2 by the frictional force produced at the contact portion between the bent portion 15 and the end face 2a.

Figure 8:
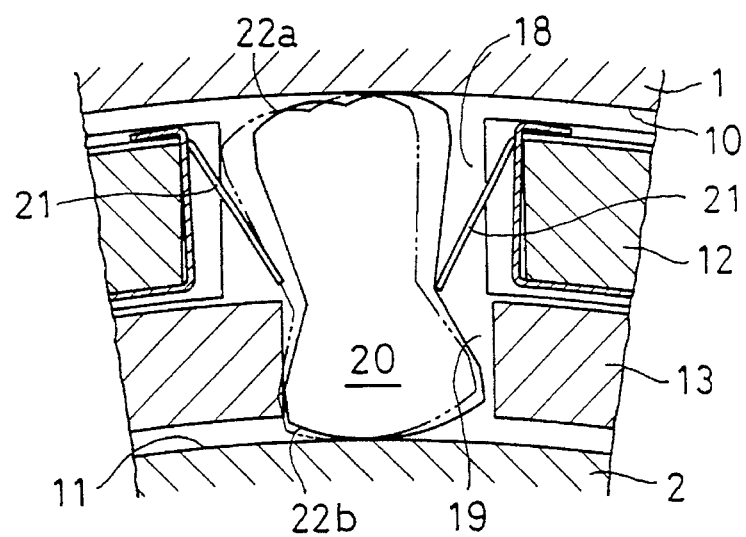
FIG. 8 is a sectional view showing how the sprags operate while the vehicle is moving ahead.

As shown in FIGS. 4 and 8, the first retainer 12 and second retainer 13 have a plurality of mutually opposite pockets 18 and 19, respectively. In each pair of opposite pockets 18, 19 are mounted a sprag 20 as an engaging element and springs 21 retaining the sprag 20.

The sprags 20 have symmetrical arcuate outer and inner peripheral surfaces 22a and 22b. The outer peripheral surface 22a has a center of curvature located inside of the sprag, while the inner peripheral surface 22b has a center of curvature located outside of the sprag, respectively. When the sprags 20 are inclined a predetermined angle in either direction, they will engage both cylindrical surfaces 10 and 11, thereby coupling the outer ring 1 and inner ring 2 together. The springs 21 have one end thereof supported on the first retainer 12 and urge the respective sprags 20 from both sides. The sprags 20 are held so that when the second retainer 13 rotates relative to the first retainer 12, the sprags 20 will engage the cylindrical surfaces 10 and 11.

Figure 5:
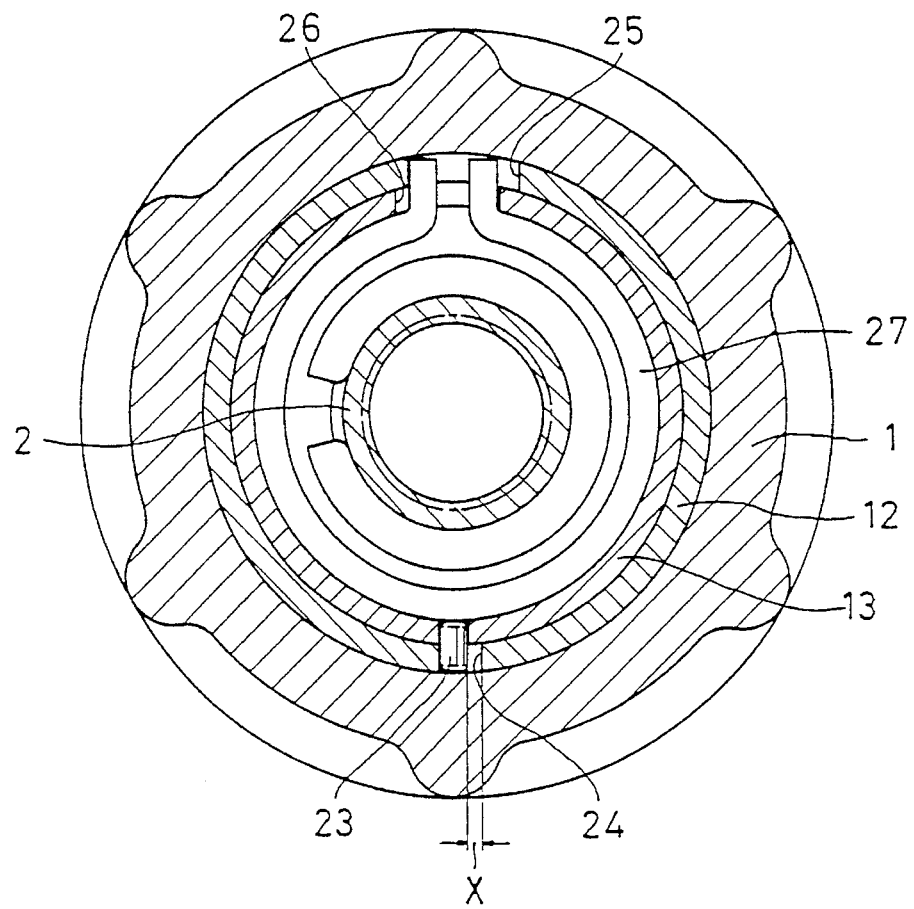
FIG. 5 is a view as viewed from line V—V of FIG. 2.

As shown in FIGS. 2 and 5, the second retainer 13 has a stopper pin 23 on its front end, which fits in a square hole 24 formed in the first retainer 12. A gap X is formed around the stopper pin 23 in the direction of rotation. The gap X is smaller than the plays Y in the direction of rotation formed between the torque transmitting protrusions 4 and 5 (X<Y).

Slits 25 and 26 are formed in the peripheral surfaces of the first retainer 12 and second retainer 13, respectively. A C-shaped switch spring 27 have both ends thereof engaged in the slits 25, 26. The switch spring 27 is set in a compressed state with one end thereof pressed against the first retainer 12 and the other end against the second retainer 13 to urge the retainers 12 and 13 in circumferential opposite directions. Thus, the first retainer 12 is imparted a turning effort in a direction opposite to the direction of the turning effort applied thereto when a one-way clutch 28, which is to be described later, is engaged, and rotates until the wall of the square hole 24 abuts the stopper pin 23, which is press-fitted in the second retainer 13.

Figure 9:
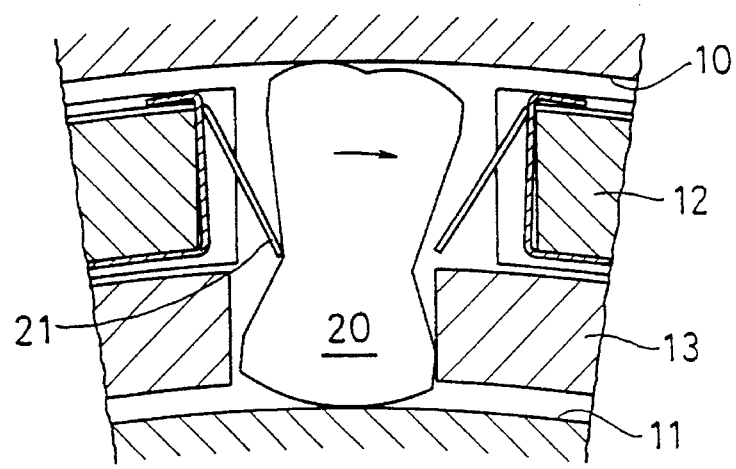
FIG. 9 is a sectional view showing how the sprags operate while the vehicle is moving backward.

As shown in FIGS. 8 and 9, the gap X formed in the direction of rotation between the stopper pin 23 and square hole 24 is large enough to allow the sprags 20 to incline until they engage the cylindrical surfaces 10, 11. By the spring force of the switch spring 27, the retainers 12, 13 and sprags 20 are kept in a ready-to-engage state where they are engageable when the inner ring rotates when the vehicle travels forward. In this arrangement, the switch spring 27 serves as the first turning effort imparting means for imparting a turning effort to the first retainer 12.

Figure 6:
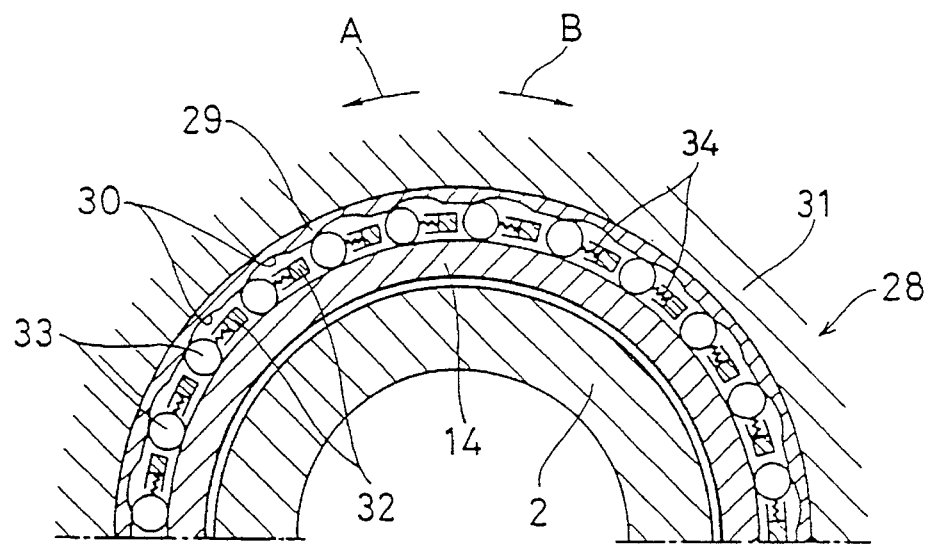
FIG. 6 is a sectional view of the one-way clutch.

On the other hand, at the rear end of the extension arm 14 of the first retainer 12 is mounted a one-way clutch 28 for switching on and off the coupling of the first retainer 12 and the second turning effort imparting or rotation resisting means 6, which is to be discussed later. As shown in FIG. 6, the one-way clutch 28 has a clutch outer ring 29 press-fitted in the input ring 31 and provided on the inner periphery thereof with a plurality of inclined cam surfaces 30 arranged circumferentially at regular intervals. An annular retainer 32 is provided between the clutch outer ring 29 and the extension arm 14. The retainer 32 is formed with pockets in which are mounted rollers 33 as engaging elements and springs 34 for urging the rollers 33 against the surfaces of the inclined cam surfaces 30 and the extension arm 14.

With the arrangement of the one-way clutch 28, when the first retainer 12 is rotated in the direction of arrow A of FIG. 6, the rollers 33 will bite into between the cam surfaces 30 and the extension arm 14, coupling the first retainer 12 and an input ring 31 of a rotation resisting means 6. In contrast, when the first retainer 12 turns in the direction of arrow B in FIG. 6, the rollers 33 are disengaged, thus releasing the engagement between the first retainer 12 and the input ring 31.

Figure 7:
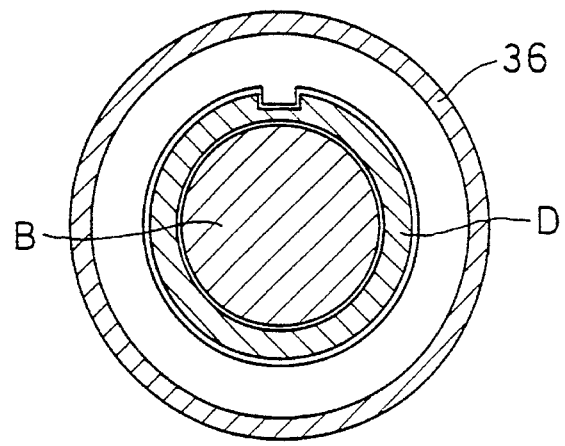
FIG. 7 is a sectional view taken along line VII—VII of FIG. 2.

The rotation resisting means 6 has, as shown in FIGS. 2 and 7, the input ring 31 and a resistor case 36 unrotatably engaged in an axial groove formed in the knuckle D. The input ring 31 has a flange 35 disposed between and in frictional contact with the resistor case 36 and a torque adjusting member 37 through resistor members 38. A frictional contact portion 39 is urged by a spring 41 mounted between the torque adjusting member 37 and a snap ring 40.

The spring 41 has such a spring force as to produce a predetermined frictional force at the frictional contact portion 39. By the frictional force thus produced, a dragging torque is produced at the frictional contact portion 39. The dragging torque thus produced imparts a turning effort in a negative direction or resists rotation to delay the rotation of the input ring 31, which otherwise tends to rotate together with the first retainer 12.

The turning effort P1 produced at the frictional contact portion 39 is set to be larger than the turning effort P2 applied to the first retainer 12 by the force of the switch spring 27 and smaller than the turning effort P3 acting on a front wheel axle B from the driving path. Namely, the relation P2<P1<P3 has to be satisfied. With this arrangement, when the one-way clutch 28 engages so that the first retainer 12 and the input ring 31 rotate in unison, the turning effort produced at the frictional contact portion 39 will overcome the turning effort produced by the switch spring 27, thereby switching the phases of the first retainer 12 and the second retainer 13 in opposite directions.

The hub clutch device of this embodiment is mounted as shown in FIGS. 1 and 2. Namely, its inner ring 2 is coupled to the front wheel axle B, while its outer ring 1 is coupled to the wheel hub C through the torque transmitting protrusions 4, 5. It is mounted so that, while the vehicle is traveling forwardly, the inner ring 2 will rotate in such a direction that the one-way clutch 28 disengages (direction of arrow B of FIG. 6), and while the vehicle is moving backward, it will rotate in such a direction that the one-way clutch 28 engages (direction of arrow A of FIG. 6).

Figure 10:
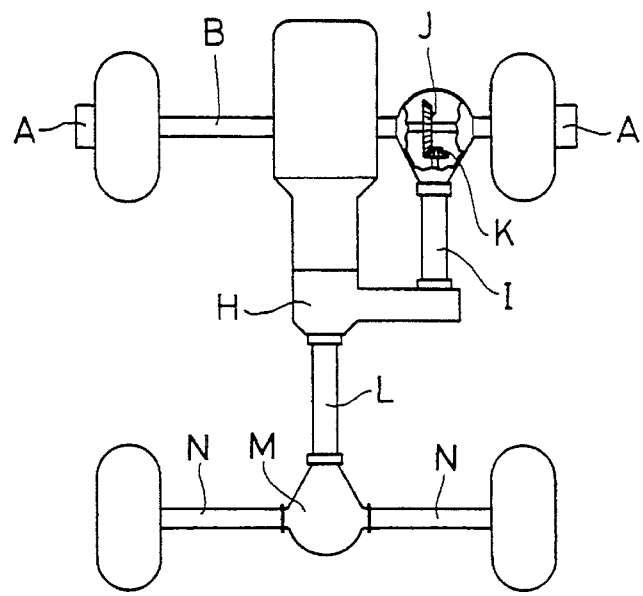
FIG. 10 is a view showing one example of the driving force transmission mechanism of a vehicle.

FIG. 10 shows the driving force transmission of a four-wheel drive vehicle provided with the hub clutch devices A. The front wheel axle B, which is coupled to the hub clutch devices A, is directly coupled through a ring gear J and a pinion gear K to a front propeller shaft I branching from a transfer H. A rear propeller shaft L extending from the transfer H is coupled to a rear wheel axle N through a rear differential M.

When the vehicle begins to move forward, the inner ring 2 rotates driven by the front wheel axle B. The second retainer 13, integrally coupled to the inner ring 2, rotates together with the inner ring 2. The first retainer 12 also turns biased by the switch spring 27 (FIG. 8). But while the vehicle is traveling forward, the one-way clutch 28 is kept disengaged, so that the input ring 31 of the turning effort imparting means 6, as well as the resistor case 36 and the spring 41, remains stationary.

While the vehicle is moving backward, the inner ring 2 and the second retainer 13 begin to rotate. The first retainer 12, too, rotates, biased by the switch spring 27, together with the second retainer 13. In this state, the one-way clutch 28 is engaged, so that the first retainer 12 and the input ring 31 rotate in unison. Since the turning effort P1 at the frictional contact portion 39, to which the input ring 31 is coupled, is set to be larger than the turning effort P2 produced by the switch spring 27, the first retainer 12 is decelerated by the resistance applied by the turning effort imparting means 6. The sprags 20 will thus incline in the opposite direction to the above to the ready-to-engage position for engagement between the cylindrical surfaces 10, 11 as shown in FIG. 9. Thereafter, the first retainer 12 keeps rotating under the turning effort by the frictional contact portion 39, thereby keeping the sprags 20 in the ready-to-engage position.

While the vehicle is moving forward, the one-way clutch 28 is kept idling, so that only the resistance by the switch spring 27 acts on the first retainer 12 which serves to change the phase of the sprags 20. While the vehicle is moving backward, the sliding resistance at the frictional contact portion 39 overcomes the resistance by the switch spring 27 and acts on the first retainer 12. Thus, while the vehicle is moving ahead, the bearings and the frictional contact portion 39 will never heat up and the wear of the frictional contact portion 39 is suppressed, even though the inner ring 2 rotates together with the front wheel axle B.

Also, since the frictional contact portion 39, which is kept in sliding contact, is urged by the spring 41 to produce a dragging torque, even if the contact surface gets worn, the biasing force of the spring 41 will never change, so that it is possible to prevent any sharp torque fluctuation.

While the vehicle is moving forward or backward without slipping, with the sprags 20 kept in the ready-to-engage position, the outer ring 1 and the inner ring 2 will rotate at the same speed, keeping the sprags 20 in the ready-to-engage position. No driving force is transmitted from the inner ring 2 to the outer ring 1 in this state and the vehicle is apparently driven only by the rear two wheels (actually, however, some amount of torque is distributed to the front wheels since the rear wheels slip slightly).

When the vehicle is turning with a certain steering angle, since the outer ring 1, coupled to the front wheel, rotates faster than the inner ring 2, it will overrun with respect to the sprags 20. Thus, the front wheels and the rear wheels will rotate separately from each other. This prevents braking phenomenon when turning a tight corner.

On the other hand, if the rear wheel should slip while the vehicle is moving forward or backward, the vehicle speed and thus the front wheel speed will drop, so that the rotation of the inner ring 2, coupled to the front wheel axle B, exceeds the rotational speed of the front wheels. This causes the sprags 20 to engage the cylindrical surfaces 10, 11, thus coupling the outer ring 1 and the inner ring 2 together. The driving force is now transmitted to the front wheels, so that the vehicle is driven on all four wheels.

If a large torque is applied to the sprags 20, the sprags 20 and the cylindrical surfaces 10 and 11 will be elastically deformed and the sprags 20 will interfere with the second retainer 13. Thus, a large force acts on the second retainer 13.

If this force exceeds the frictional force produced at the contact portion between the bent portion 15 of the second retainer 13 and the inner ring 2 due to the biasing force of the crimp spring 16, the second retainer 13 will begin to slip relative to the inner ring 2 by a distance equal to the amount of interference with the sprags 20. This reduces the force acting on the second retainer 13, thereby protecting the second retainer 13 and the sprags 20 from excessive forces. This in turn prevents the breakage of the retainer and abnormal wear of the sprags.

If the second retainer 13 slips and rotates relative to the inner ring 2, while the amount of its rotation is small, the first retainer 12 remains stationary. If the amount of rotation exceeds the size of the gap X formed in the direction of rotation between the stopper pin 23 and the square hole 24, the first retainer 12 will be driven by the stopper pin 23 and rotate together with the second retainer 13. In this state, the positional relation between the first retainer 12 and the second retainer 13 remains substantially unchanged, so that their switching function for the sprags will be maintained.

In this embodiment, instead of connecting the outer ring 1 directly to the wheel hub C, torque is transmitted through the torque transmitting protrusions 4, 5 with the plays Y formed therebetween in the direction of rotation. This arrangement is the same in function as the arrangement in which plays are formed in the direction of rotation between the front wheel axle B and the wheel hub C and it functions as follows:

When the vehicle is travelling forward and stopped on a slope, the sprags 20 are maintained in the forward-travel ready-to-engage position. If the vehicle begins to move backward spontaneously by gravity, only the wheel hub C and the outer ring 1 will turn backward with the front wheel axle B kept stationary. In this state, the sprags 20 will be turned in the forward direction keeping their ready-to-engage position. Thus, if the steering wheel is turned in this state to turn a tight corner, the vehicle may be braked.

In contrast, by providing the plays Y in the direction of rotation between the outer ring 1 and the wheel hub C (namely, between the front wheel axle B and wheel hub C), even if the wheel hub C is turned in the backward direction with respect to the stationary front wheel axle B, the front wheel axle B will be turned by the propeller shaft while the wheel hub 52 turns a distance equal to the size of the plays Y (that is, before the rotation is transmitted to the outer ring 1). Thus, the sprags 20 are moved from the forward-travel ready-to-engage position to the backward-travel ready-to-engage position. The outer ring 1 is now capable of overrunning with respect to the sprags 20. Thus, no braking will occur while the vehicle is turning a tight corner.

Figure 11:
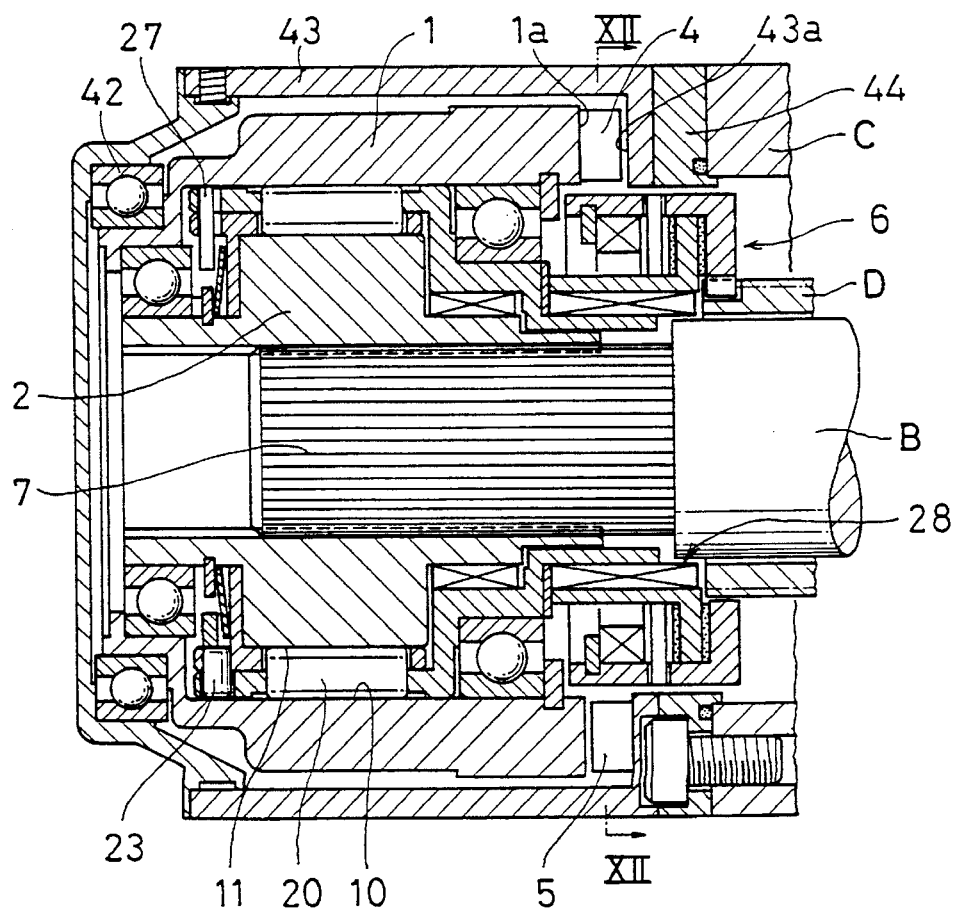
FIG. 11 is a sectional view of a second embodiment.
Figure 12:
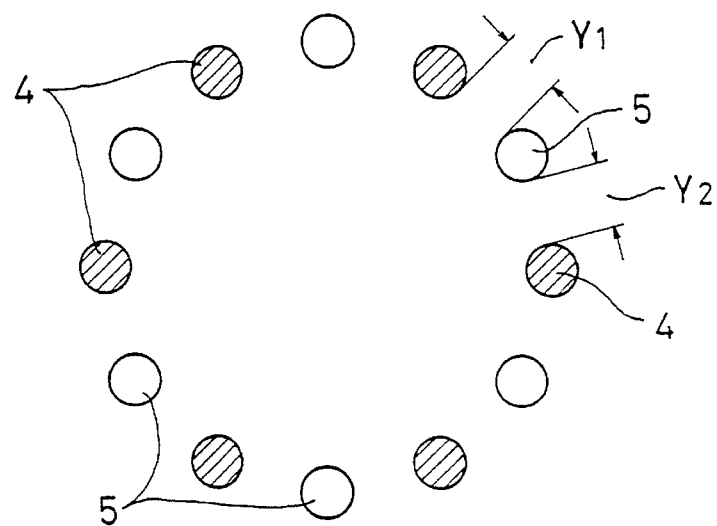
FIG. 12 is a sectional view taken along line XII—XII of FIG. 11.

FIGS. 11 and 12 show the second embodiment.

In this embodiment, an outer casing 43 is rotatably mounted around the outer ring 1 through a bearing 42. The outer casing 43 is secured to the end face of the wheel hub C through an annular member 44.

Torque transmitting protrusions 4 and 5 adapted to engage each other in the direction of rotation are provided on an inner end face 43a of the outer casing 43 and an end face 1a of the outer ring 1, respectively. Plays Y=Y1+Y2 are formed in the direction of rotation between the torque transmitting protrusions 4 and 5.

The outer casing 43, covering the entire hub clutch A, serves to prevent the intrusion of rainwater, soil and sand and also to prevent the device from being hit by small stones or the like.

Figure 13:
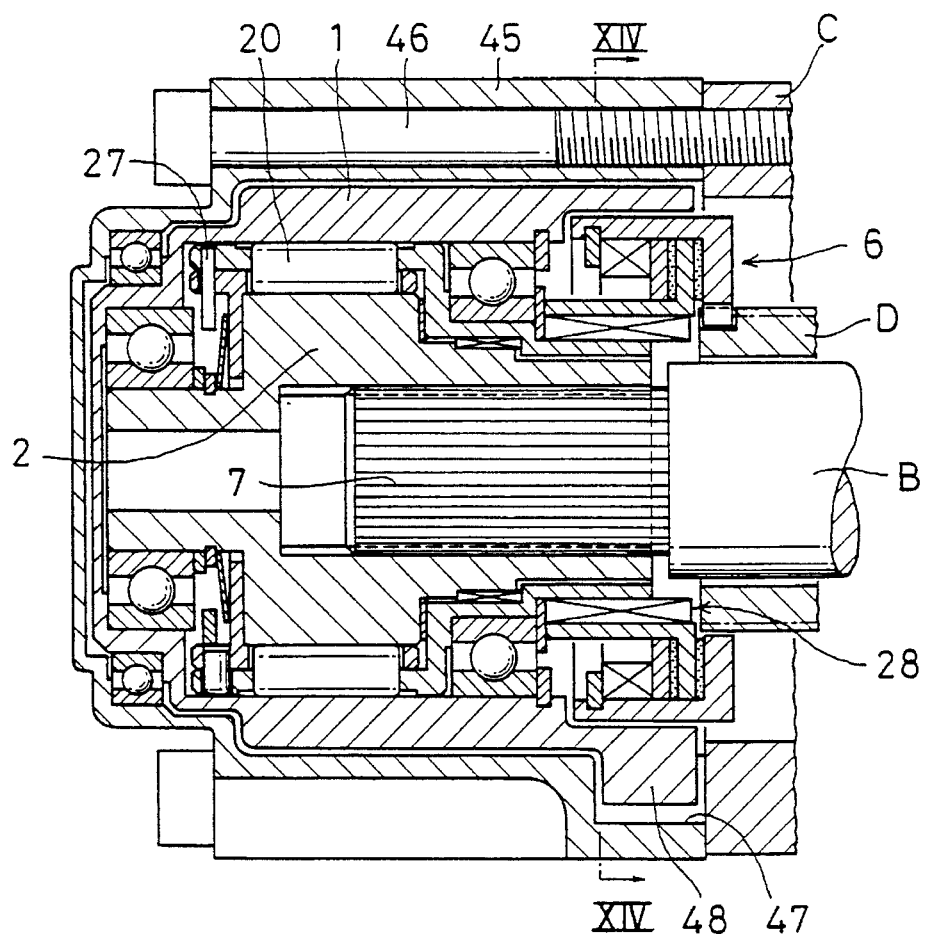
FIG. 13 is a sectional view of a third embodiment.
Figure 14:
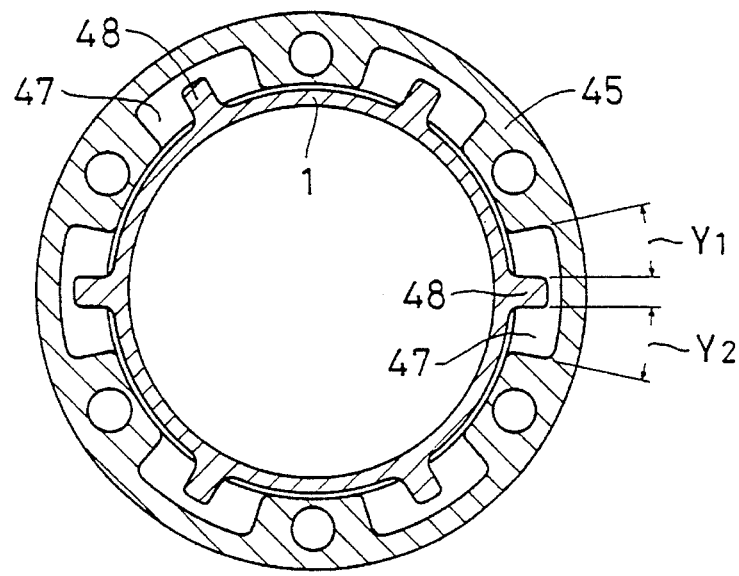
FIG. 14 is a sectional view taken along line XIV—XIV of FIG. 13.

FIGS. 13 and 14 show the third embodiment, in which an outer casing 45 covering the outer ring 1 is secured directly to the wheel hub C by bolts 46.

A plurality of grooves 47 for torque transmission are formed in the inner peripheral surface of the outer casing 45. On the outer peripheral surface of the outer ring 1 are provided protrusions 48 for torque transmission which engage in the respective grooves 47. Plays Y=Y1+Y2 are formed in the direction of rotation between the protrusions 48 and the grooves 47.

Except that the outer casing 43 or 45 is secured to the wheel hub C, the second and third embodiments are basically the same in structure and function as the first embodiment. Thus, the same parts are denoted by the same numerals and their description is omitted.

Figure 15:
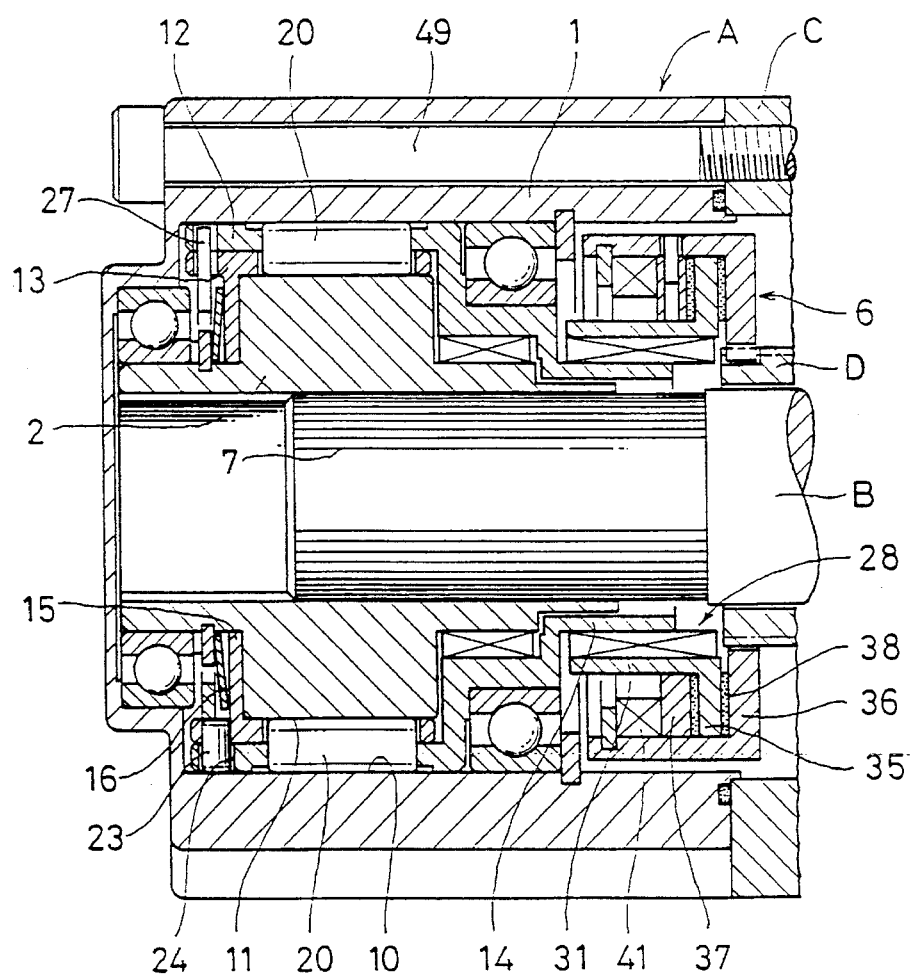
FIG. 15 is a sectional view of a fourth embodiment.
Figure 16:
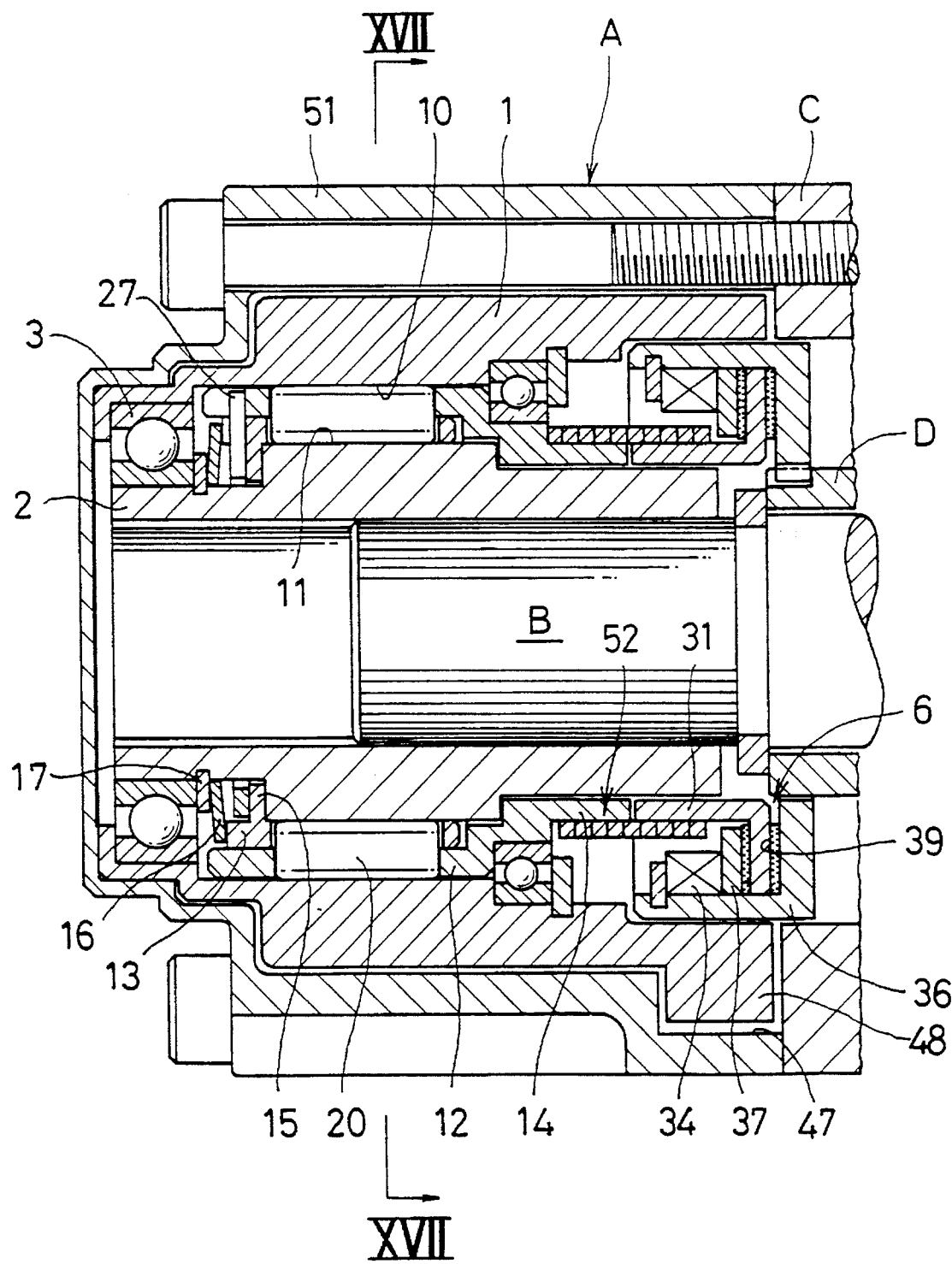
FIG. 16 is a sectional view of a fifth embodiment.
Figure 17:
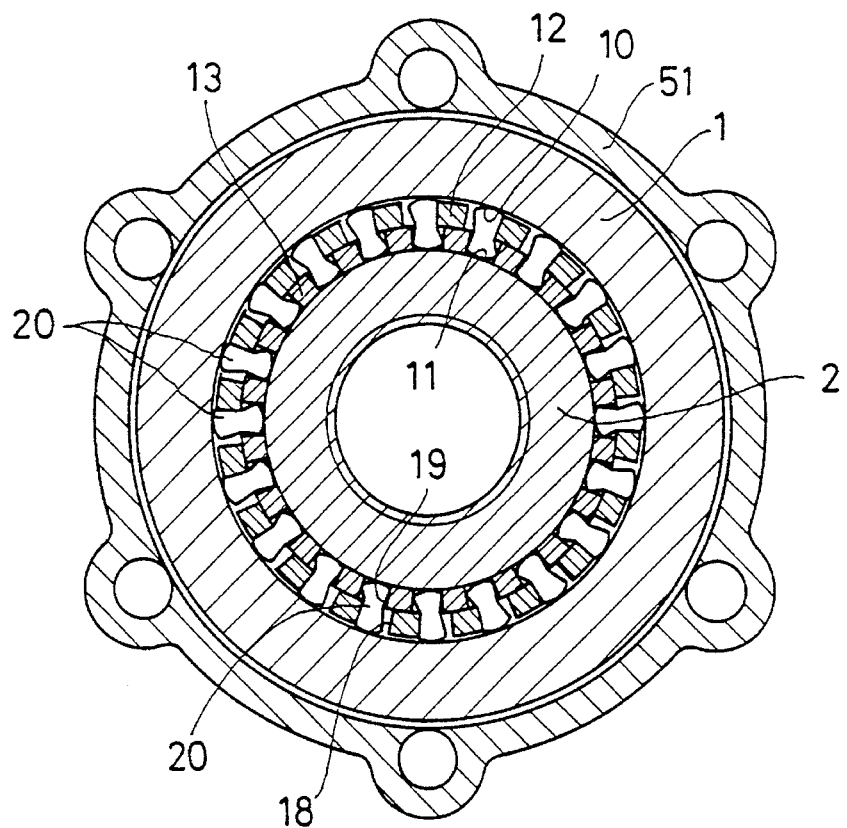
FIG. 17 is a sectional view taken along line XVII—XVII of FIG. 16.

FIG. 15 shows the fourth embodiment.

In this embodiment, the outer ring 1 as the driven member of the hub clutch device A is integrally coupled to the wheel hub C by means of bolts 49, so that the torque transmitted through the inner ring 2 and the sprags 20 is transmitted directly from the outer ring 1 to the wheel hub C without plays therebetween.

Since the outer ring 1 and the wheel hub C are directly coupled together, if the vehicle is moved backward with the sprags 20 kept in the forward-travel ready-to-engage position, the vehicle might be braked if the steering wheel is operated to turn a tight corner. But actually, such a possibility is negligibly small and even if this phenomenon does occur, the degree of braking is, in most cases, within a permissible range. Thus, the hub clutch device having such a direct-connection structure will show practically sufficient performance.

FIGS. 16 to 19 show the fifth embodiment.

In this embodiment, an outer casing 51 coupled to the wheel hub C is mounted on the outer ring 1.

Figure 19A:
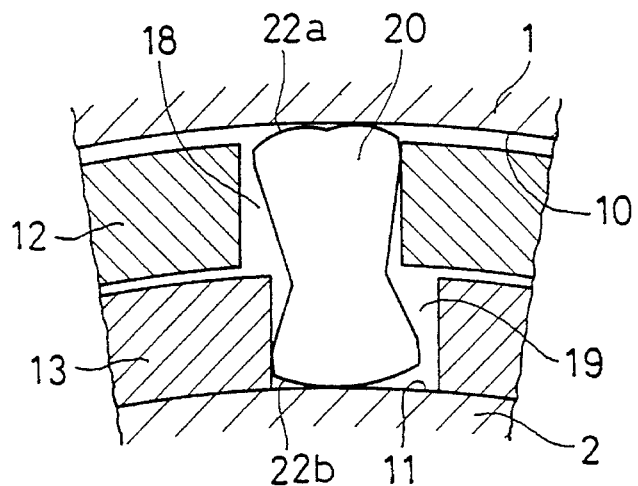
FIGS. 19A and 19B are sectional views showing different operational states of the sprags.
Figure 19B:
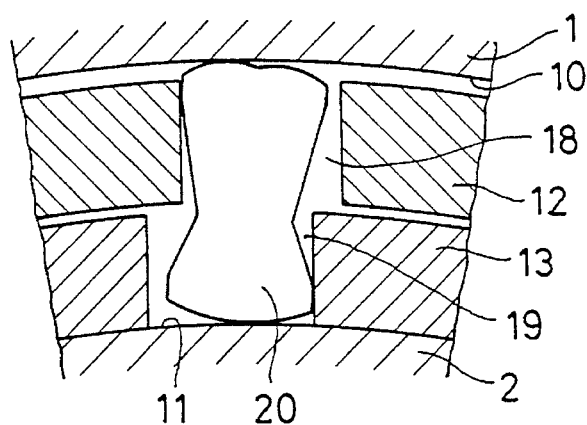

The first retainer 12 has pockets 18, in which no springs for retaining the positions of the sprags 20 are provided. The pockets 18 and 19 of the first retainer 12 and the second retainer 13 have such widths that the sides of the pockets 18 and 19 directly abut and incline the sprags 20 until they engage as shown in FIG. 19.

Between the first retainer 12 and the turning effort imparting means 6 is mounted a clutch spring 52 in place of the one-way clutch including rollers.

Figure 18A:
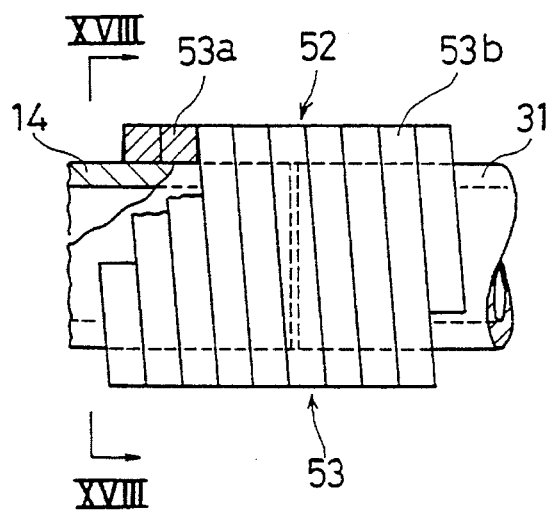
FIG. 18A is a vertical sectional view of the clutch spring.
Figure 18B:
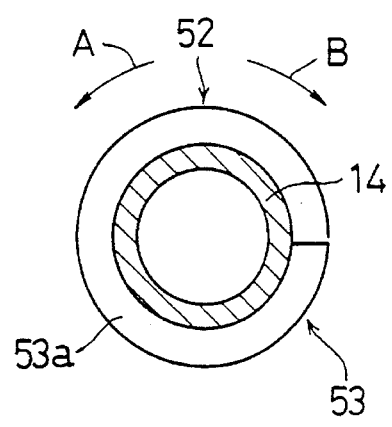
FIG. 18B is a sectional view of the same as viewed from line XVIII—XVIII.

As shown in FIGS. 18A and 18B, the clutch spring 52 is a coil-shaped spring consisting of a large number of coils 53 arranged continuously in the longitudinal direction and is mounted so as to straddle the extension arm 14 of the first retainer 12 and the input ring 31 of the turning effort imparting means 6. In this case, the coil 53a at the front portion of the clutch spring 52 is tight-fitted with a weak force on the extension arm 14, while the coil 53b at the rear portion is strongly tight-fitted on the input ring 31. Since the front coil 53a is tight-fitted with a weak force, its inner surface is in light contact with the outer surface of the extension arm 14. By the frictional force produced by this contact pressure, the coil 53a is adapted to turn either in the loosening or tightening direction.

With this clutch 52, when the first retainer 12 is turned through the inner ring 2 in the direction of arrow A in FIG. 18B, the extension arm 14 and the input ring 31 will rotate relative to each other in such directions that the coil 53 is tightened (locked), so that the clutch spring 52 is tightened against the outer periphery of the extension arm 14. Thus, the first retainer 12 and the turning effort imparting means 6 are coupled together, so that torque can be transmitted therethrough. In contrast, when the first retainer 12 turns in the direction of arrow B of FIG. 18B, the clutch spring 52 is deformed in such a direction that the coil loosens, so that the coil 53 and the extension arm 14 will disengage from each other. The first retainer 12 will thus separate from the turning effort imparting means 6.

This hub clutch device has to be mounted on a vehicle so that, while the vehicle is moving ahead, the inner ring 2 will rotate in such a direction that the clutch spring 52 is disengaged (direction of arrow B of FIG. 18B) and while the vehicle is moving backward, it will rotate in such a direction that the clutch spring 52 is tightened (direction of arrow A of FIG. 18B).

Figure 20:
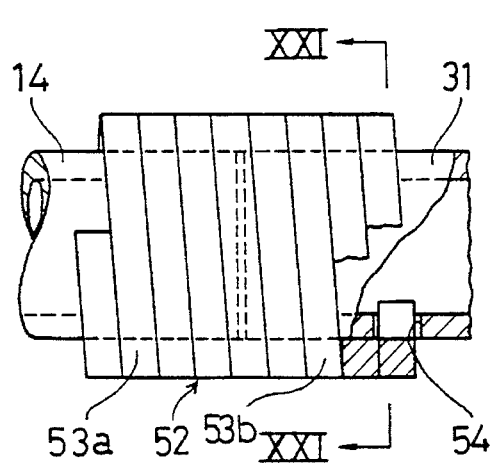
FIG. 20 is a partially vertical sectional view of another embodiment of the clutch spring.
Figure 21:
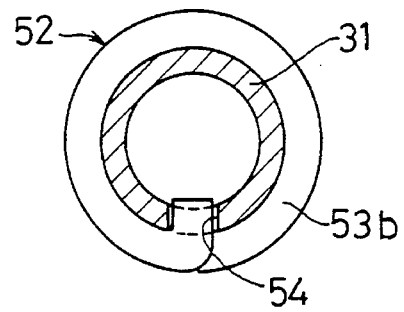
FIG. 21 is a sectional view as viewed from line XXI—XXI of FIG. 20.

FIGS. 20 and 21 show another embodiment of the clutch spring 52. Its coil 53b at the rear portion has its free end engaged in a hole 54 formed in the input ring 31, thereby coupling the clutch spring 52 to the input ring 31. The coil 53a at the front portion is tight-fitted with a weak force on the outer periphery of the extension arm 14 as with the above embodiment.

Figure 22:
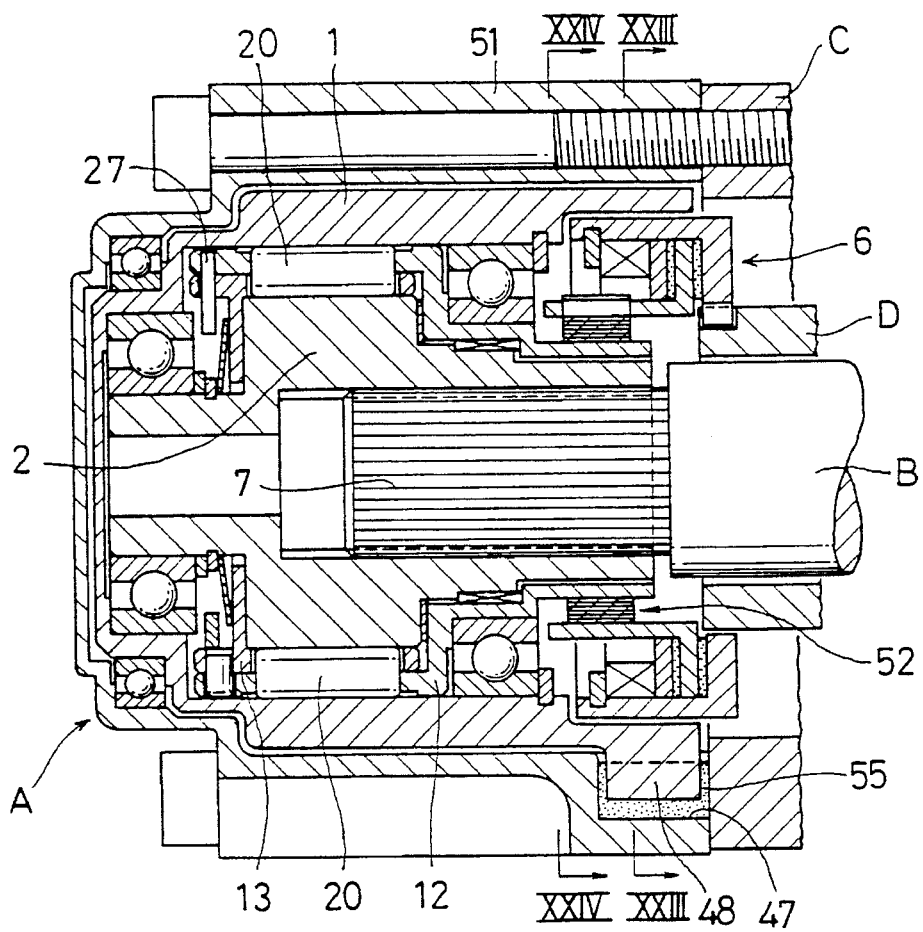
FIG. 22 is a sectional view of a sixth embodiment.
Figure 23:
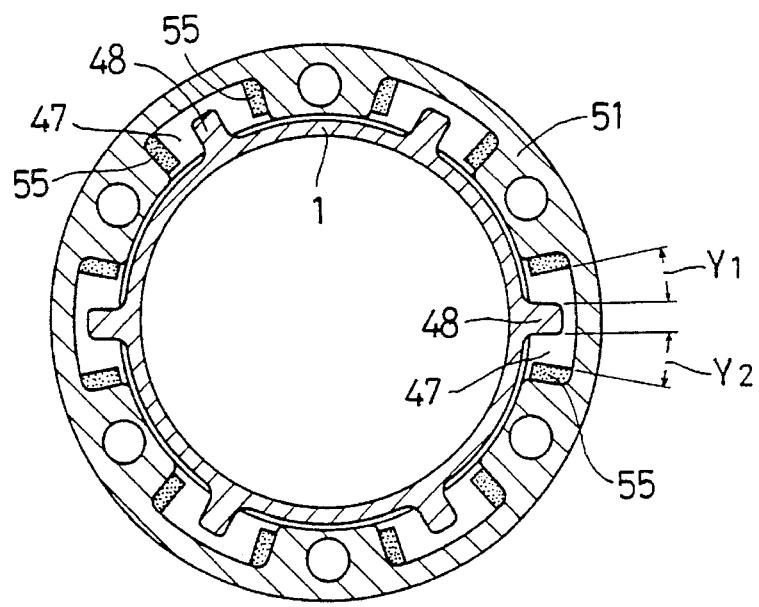
FIG. 23 is a sectional view taken along line XXIII—XXIII of FIG. 22.
Figure 24:
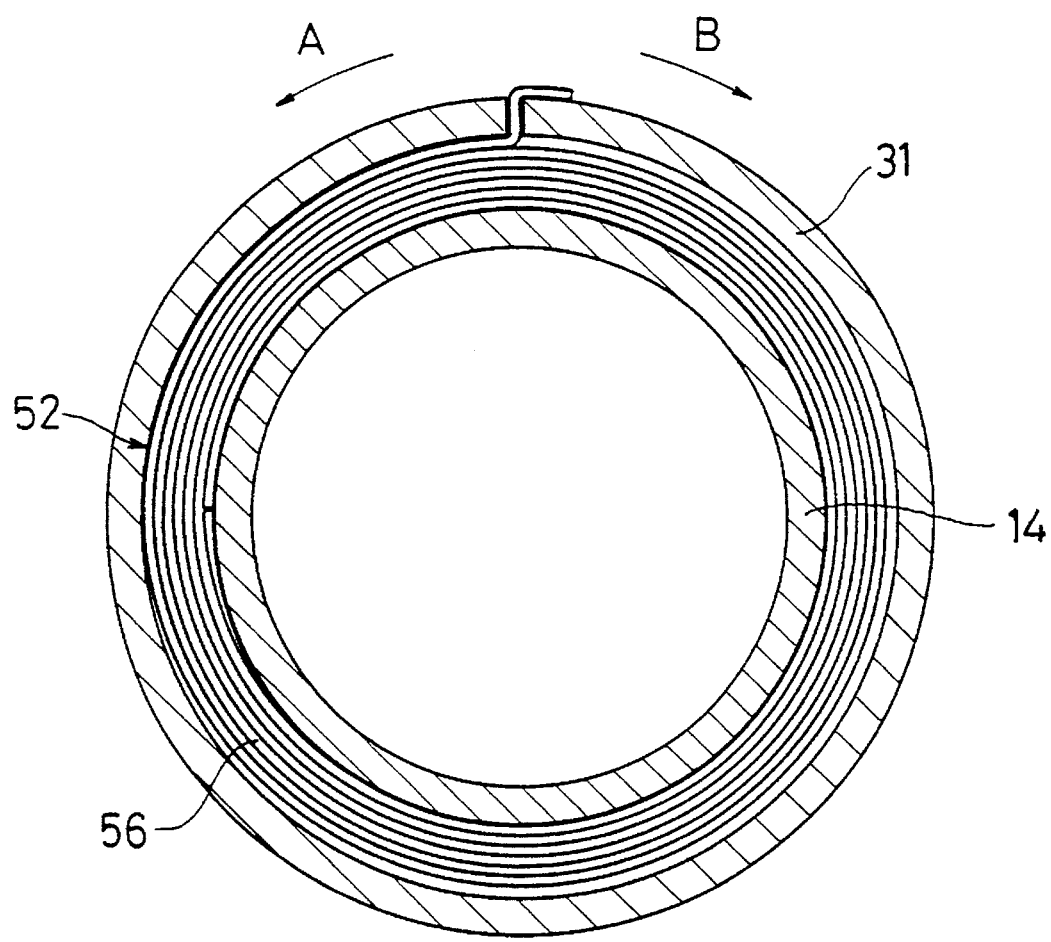
FIG. 24 is a sectional view taken along line XXIV—XXIV of FIG. 22.
Figure 25:
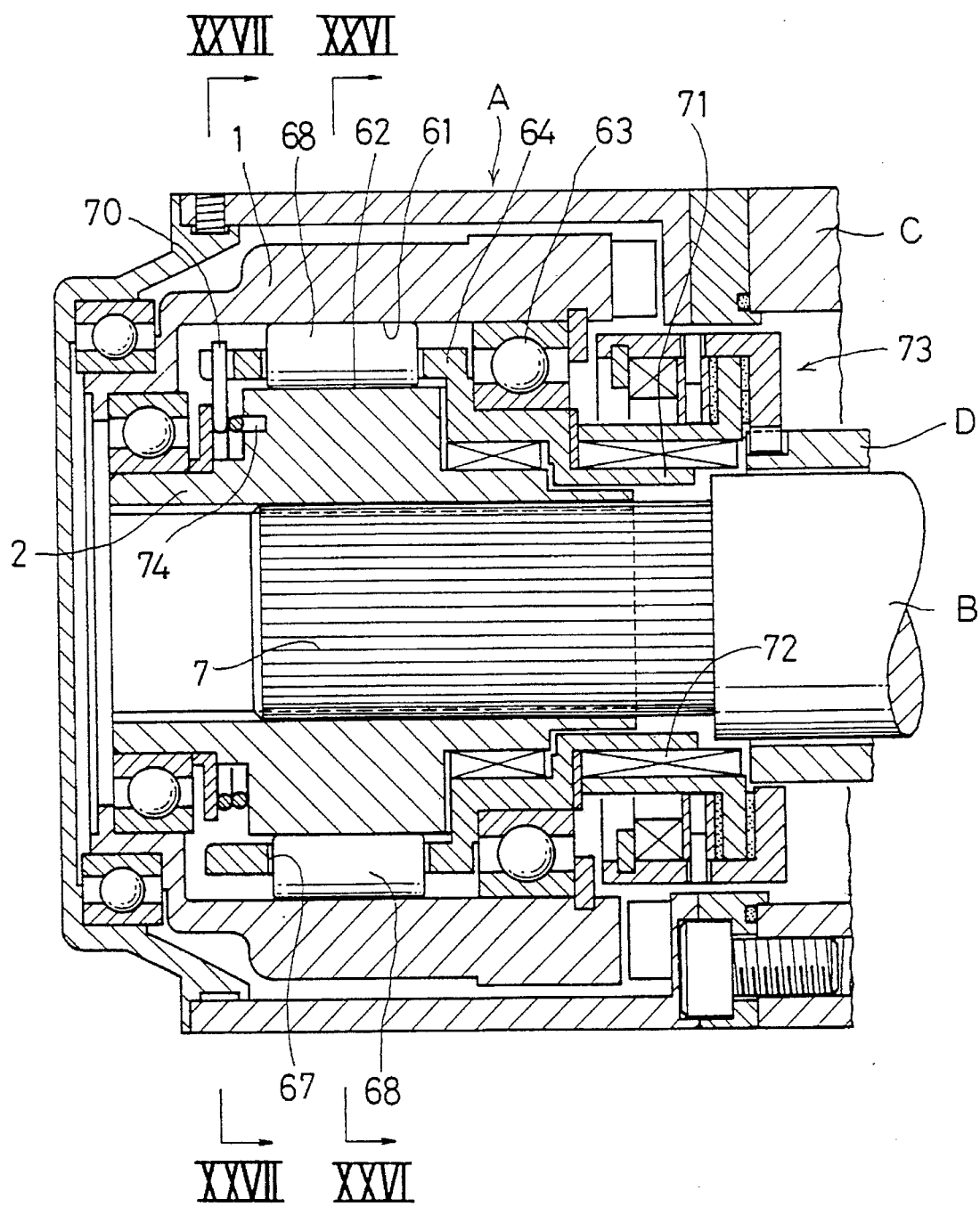
FIG. 25 is a sectional view of a seventh embodiment.
Figure 26:
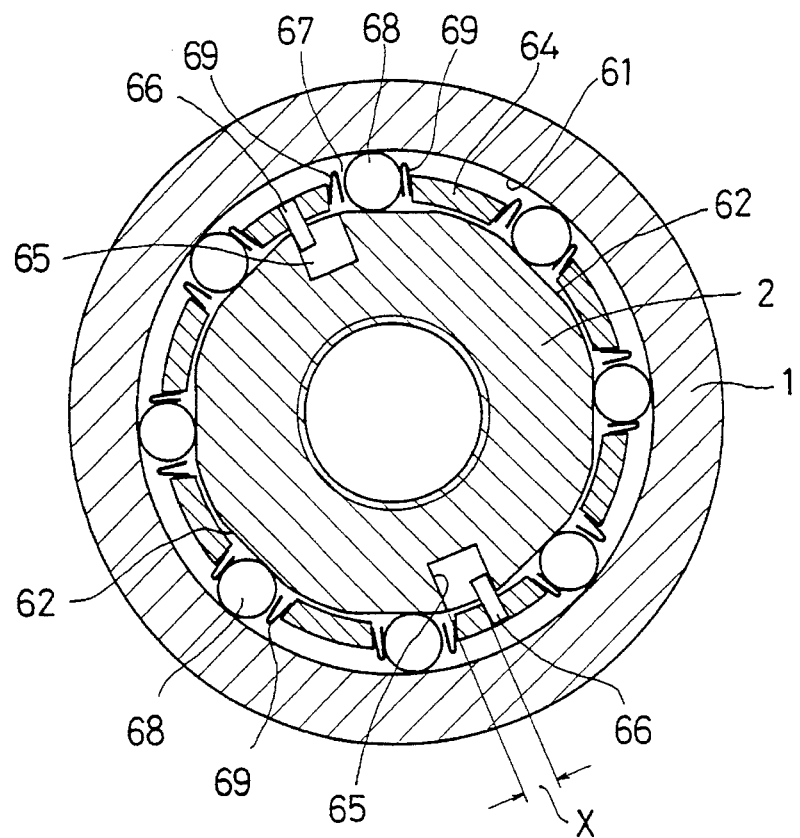
FIG. 26 is a sectional view taken along line XXIV—XXIV of FIG. 25.
Figure 27:
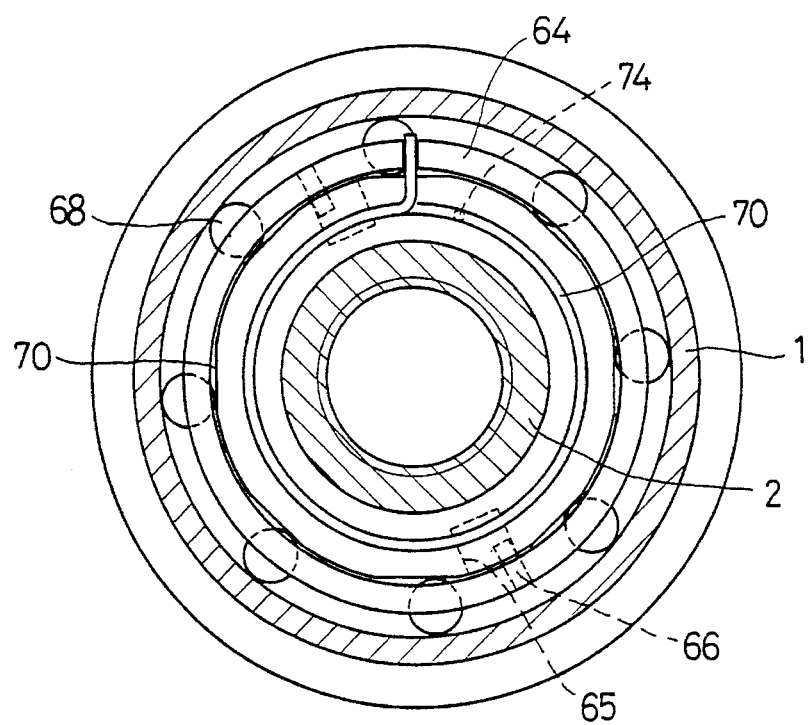
FIG. 27 is a sectional view taken along line XXVII—XXVII of FIG. 25.
Figure 28A:
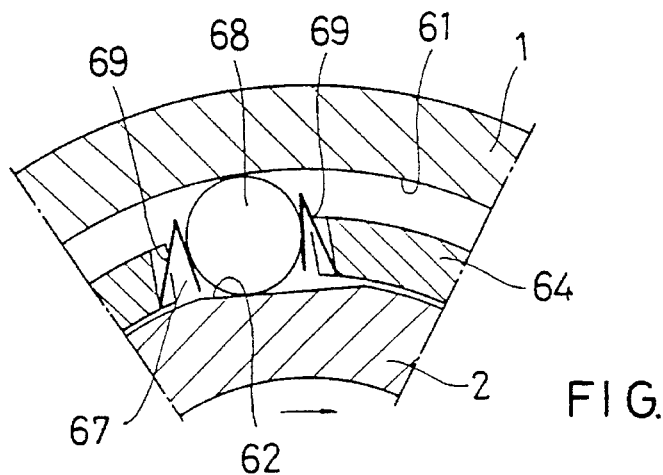
FIGS. 28A and 28B are sectional views showing different operational states of the rollers.
Figure 28B:
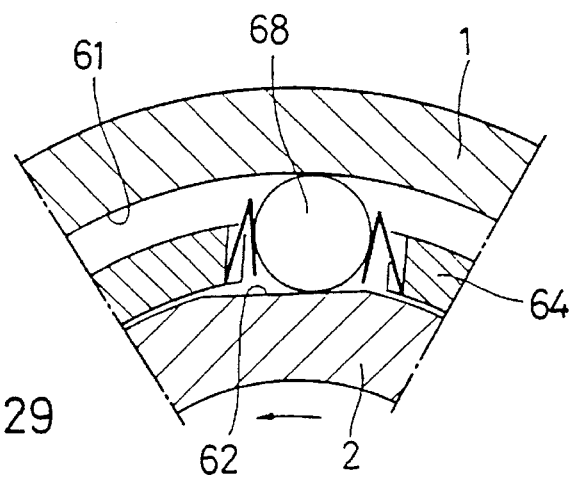

FIGS. 22 to 24 show the sixth embodiment of the hub clutch device.

This embodiment is the same as the fifth embodiment except that cushioning members 55 made of e.g. rubber are attached to both sides of the grooves 47 for torque transmission formed in the inner periphery of the outer casing 51 to absorb shocks produced when the protrusions 48 of the outer ring 1 abut the side walls of the grooves 47 for more smooth torque transmission.

The clutch spring 52 used here is a spiral spring formed by laminating a plurality of coils 56 in a radial direction. The coil 56 has its inner end engaged in the extension arm 14 of the first retainer 12 and the outer end engaged in the inner ring 31.

With this arrangement, when the first retainer 12 rotates in the direction of arrow A of FIG. 24, the coil 56 of the clutch spring 52 is tightened, causing the first retainer 12 and the turning effort imparting means 6 to be coupled together. In contrast, when the first retainer 12 rotates in the direction of arrow B of FIG. 24, the coil 56 of the clutch spring 52 will loosen, uncoupling the first retainer 12 from the turning effort imparting means 6.

FIGS. 25 through 28 show the seventh embodiment, in which the engaging elements are not sprags but rollers.

Namely, the outer ring 1 is formed with a cylindrical surface 61 on the inner periphery thereof. The inner ring 2 is provided on the outer periphery thereof with a plurality of flat cam surfaces 62 at predetermined intervals so as to face the cylindrical surface 61. Each cam surface 62 defines, in cooperation with the cylindrical surface 61 of the outer ring 1, a wedge space that narrows gradually toward both sides thereof.

An annular retainer 64 is provided between the outer ring 1 and the inner ring 2 through a bearing 63. To the retainer 64 are coupled stopper pins 66 which are received in a pin hole 65 formed in the peripheral wall of the inner ring 2.

The retainer 64 is formed with circumferentially arranged pockets 67 as many as the cam surfaces 62. Each pocket 67 accommodates a roller 68 and springs 69. That is, one roller 68 is provided on each cam surface 62 of the inner ring 2. When the rollers 68 are moved a predetermined distance circumferentially by the retainer 64, they will engage the cam surfaces 62 and the cylindrical surface 61, coupling the outer ring 1 and the inner ring 2 together. The springs 69 are mounted between the rollers 68 and the side walls of the pockets 67 to urge the rollers 68 from both sides and keep them in neutral positions where they are not in engagement. When the retainer 64 moves a predetermined distance circumferentially relative to the cam surface 62, only the springs on one side of the rollers 68 act thereon, thereby pushing them against the engaging surfaces.

A spring seat 74 is formed on the front end face of the inner ring 2. A torsion coil spring 70 is mounted between the inner periphery of the retainer 64 and the outer periphery of the inner ring 2. The torsion coil spring 70 has its one end secured to the spring seat 74 and the other end to the retainer 64. Its spring force acts to urge the retainer 64 to rotate it in the direction opposite to the direction in which the inner ring 2 rotates when the vehicle travels forward. (Namely, this torsion coil spring 70 acts as the first turning effort imparting means.)

On the other hand, the retainer 64 has an extension arm 71 that extends rearwardly from its rear end to form a one-way clutch 72. A second turning effort imparting means 73 is coupled to the one-way clutch 72.

The one-way clutch 72 and the second turning effort imparting means 73 are of the same structures as the one-way clutch 28 and the second turning effort imparting means 6 in the first embodiment. The turning effort produced by the second turning effort imparting means 73 is set to be larger than the turning effort imparted to the retainer 64 by the torsion coil spring 70.

In the arrangement of the seventh embodiment, whichever the vehicle is moving forward or backward, the rotation of the retainer 64 is delayed relative to the rotation of the inner ring 2. Thus, the rollers 68 are moved to the position shown in FIG. 28 where they engage the cylindrical surface 61 and the cam surfaces 62.

Figure 29:
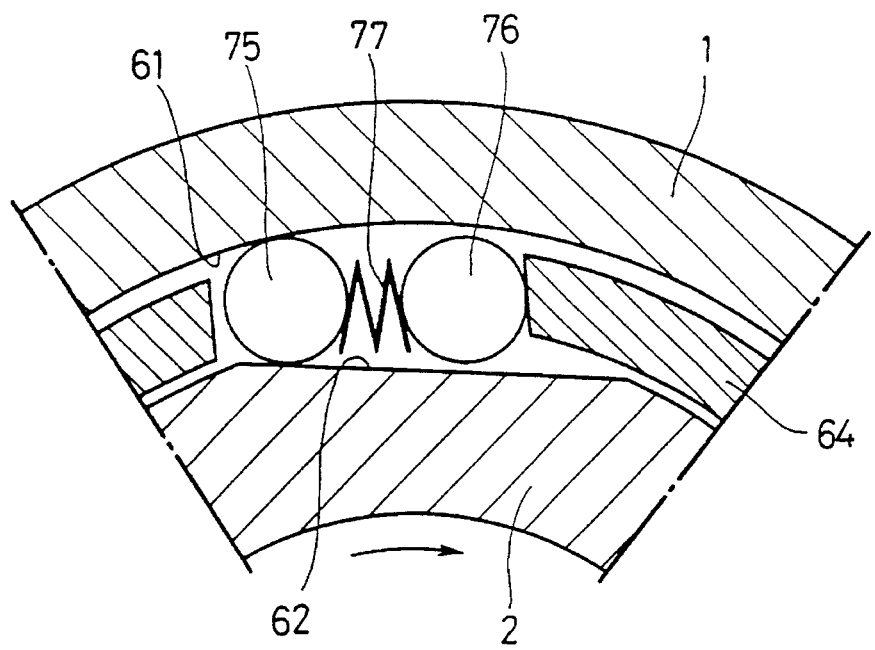
FIG. 29 is a sectional view of an eighth embodiment showing how it operates.

FIG. 29 shows the eighth embodiment. This embodiment is similar to the seventh embodiment but differs therefrom in that two rollers 75 and 76 are provided between each cam surface 62 and the cylindrical surface 61. A spring 77 is mounted between the rollers 75 and 76 to bias them away from each other.

With this arrangement, when the inner ring 2 rotates in the direction of arrow as shown in FIG. 29, the decelerating retainer 64 urges the roller 76 through the spring 77 into the engaging position.

In the first to sixth embodiments, we showed sprags engageable in both directions as engaging elements for engaging the outer ring to the inner ring. But such engaging elements may comprise pairs of symmetrically arranged sprags, one of each pair engageable in one direction and the other engageable in the opposite direction.

The driving force transmission of the vehicle shown in FIG. 10 is of a type in which the front propeller shaft I is directly coupled to the front wheel axle B. But they may be coupled together through a front differential.

What is claimed is:

1. A hub clutch device comprising a driving member coupled to a front wheel axle, a driven member coupled to a wheel hub and rotatably mounted around said driving member, said driving member and said driven member being formed with concentric cylindrical surfaces on opposed surfaces thereof, a plurality of sprags mounted between said driving member and said driven member and adapted to engage said driving member and said driven member to couple them together when they rotate in either direction, first and second retainers mounted between said driving member and said driven member for keeping said sprags spaced apart by a predetermined angular distance from one another and having engaging arcuate surfaces on both ends, said first retainer being coupled to said driving member with a play defined therebetween in the direction of rotation, said second retainer coupled to said driving member so that said second retainer and said driving member will rotate relative to each other when a predetermined torque is applied to said second retainer, said first retainer and said second retainer being formed with a plurality of pockets which are opposite to each other along diameter lines to receive the ends of said sprags a turning effort imparting means provided between said first retainer and said second retainer for imparting to said first retainer a turning effort in one direction, rotation resisting means for applying a force resisting the rotation of said first retainer in said one direction, the resisting force given by said rotation resisting means being a frictional force, and a one-way clutch provided between said first retainer and said rotation resisting means for turning on and off the coupling therebetween, said resisting force produced by said rotation resisting means being set to be larger than the turning effort produced by said turning effort imparting means.

2. A hub clutch device as claimed in claim 1 wherein said second retainer is coupled to said driving member through a spring so that they will rotate relative to each other when a predetermined torque is applied to said second retainer, and said turning effort imparting means is an elastic member disposed between said first retainer and said second retainer for imparting to said first retainer a turning effort in said one direction.

3. A hub clutch device as claimed in claim 2 wherein said one-way clutch is a clutch spring having coils provided at the coupling portion between said rotation resisting means and said first retainer so that, when said rotation resisting means and said first retainer rotate relative to each other in one direction the coils of said clutch spring will loosen, thereby cutting off the torque transmission therebetween and, when they rotate relative to each other in the other direction, the coils of said clutch spring are tightened, thereby allowing torque transmission therebetween.

4. A hub clutch device as claimed in claim 2 wherein said pockets formed in said first retainer and said second retainer have side walls thereof disposed opposite to both ends of said sprags with a play left therebetween, so that when said retainers rotate relative to each other, said sprags are urged directly by the side walls of said pockets and inclined to assume the engaging positions.

5. A hub clutch device comprising a driving member coupled to a front wheel axle, a driven member coupled to a wheel hub and rotatably mounted around said driving member, one of the opposite surfaces of said driving member and said driven member being cylindrically shaped while the other of the opposing surfaces has a polygonal shape to define a plurality of wedge-shaped spaces between said opposing surfaces, a plurality of rollers mounted between said driving member and said driven member and adapted to engage said driving member and said driven member to couple them together when they rotate in either direction, retainer means mounted between said driving member and said driven member for keeping said rollers spaced apart by a predetermined angular distance from one another, said retainer means coupled to said driving member with a play defined therebetween in the direction of rotation, a turning effort imparting means provided for imparting to said retainer means a turning effort in one direction, rotation resisting means for applying a force resisting the rotation of said retainer means in said one direction, the resisting force given by said rotation resisting means being a frictional force, and a one-way clutch provided between said first retainer and said rotation resisting means for turning on and off the coupling therebetween, said resisting force produced by said rotation resisting means being set to be larger than the turning effort produced by said turning effort imparting means.

6. The hub clutch device as claimed in claim 5 wherein said turning effort imparting means comprises an elastic member such as a spring, said retainer means being coupled to said driving member through a spring so as to rotate with a play therebetween.

7. A hub clutch device as claimed in any of claims 1, 2, 3, 5 or 6 wherein a play larger than said play between said retainer means and said driving member is formed in the direction of rotation at the coupling portion between said driven member and said wheel hub.

8. A hub clutch device as claimed in any of claims 1, 2, 3, 5 or 6, further comprising an outer casing mounted around said driven member and coupled to said wheel hub, said outer casing and said driven member being coupled together so as to be rotatable together with a play left therebetween in the direction of rotation, said play between said outer casing and said driven member being larger than said play between said retainer means and said driving member.

9. A driving force transmission mechanism for said vehicle comprising said hub clutch devices as claimed in any of claims 1, 2, 5 or 6, mounted between a front wheel axle and front wheel hubs, said front wheel axle coupled to a propeller shaft, and a rear wheel axle coupled to said propeller shaft through a differential.

\* \* \* \* \*